June 13, 1933. H. SCHALK 1,913,685
MANUFACTURE OF LOCKING NUTS
Filed Dec. 9, 1932
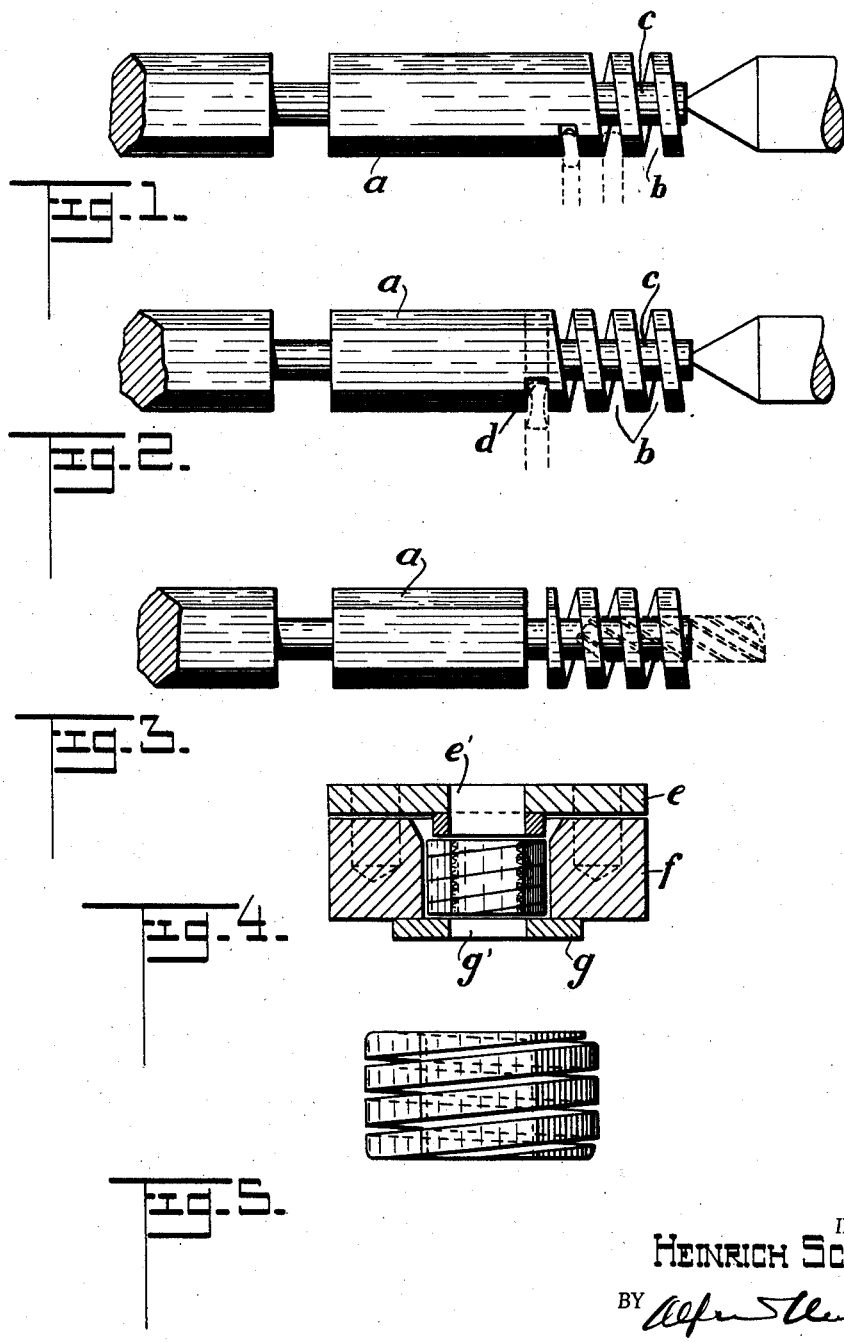
INVENTOR.
HEINRICH SCHALK.
BY
ATTORNEY.

Patented June 13, 1933

1,913,685

UNITED STATES PATENT OFFICE

HEINRICH SCHALK, OF GUSTAVSBURG NEAR MAINZ, GERMANY, ASSIGNOR TO MASCHINENFABRIK AUGSBURG-NUERNBERG A. G., OF NUREMBERG, GERMANY, A CORPORATION OF GERMANY

MANUFACTURE OF LOCKING NUTS

Application filed December 9, 1932, Serial No. 646,431, and in Germany December 14, 1931.

My invention relates to the manufacture of elastic locking nuts. It is old to make such nuts by winding on edge a strip of elastic band steel having at one side a sharp edge which is located at the inner side during the winding and is intended to constitute the thread of the nut to be made. The thus obtained thread is objectionable in that it fits only badly to the thread of the corresponding bolt, and the procedure is complicated, for, besides the operation of winding the elastic steel band, the nut made in that manner must be separately treated along its circumferential surface in order to constitute a nut of proper design.

There exists also another method for the manufacture of elastic locking nuts which, it is true, furnishes a better thread, but is also too complicated. In that method a steel band of conical transverse section is so wound that the windings contact closely with one another, and the narrow side of the band is located at the inner side of the nut where the bore is that is to be provided with threads. The thus produced helical body is subdivided into such parts as are required for the indivdual nuts. These parts are then treated along their circumferential surface, and finally the requisite thread is cut into everyone of the parts, the windings being kept compressed during the thread cutting operation.

The present improved method of manufacturing elastic locking nuts is by far simpler and dispenses with the winding of a band, as well as with circumferential treatment. Dispensing with winding a band might be obtained also by cutting threads into a tube, down through the entire wall thickness of the same, but it would nevertheless be necessary to treat the outer surface of the tube so as to obtain nuts of the proper shape, and besides, the cutting off of such pieces as are required to constitute the individual nuts is also rather complicated.

In contradistinction to those known procedures, I make use of a steel bar of hexagonal cross-section and I cut the windings or threads into this bar down to such a depth that if the bar had already a bore corresponding to the bore of the nuts to be made, said windings or threads would at their bottom communicate with that bore. After a certain number of windings or threads has been cut into the bar, also a circumferential groove is cut therein to the same depth as said windings, whereby the respective number of windings (viz. as many as are requisite for a nut) is separated from the body part of the hexagonal bar. Now the core that has remained inside the windings is bored out, the helical piece thus obtained is axially compressed and thereupon the bolt thread is cut into the nut. Thereafter the nut is freed from the axial pressure, the width of the thread is adjusted, and finally the nut is hardened in well-known manner by heating and subsequently cooling.

In order to make my invention perfectly clear, I refer to the accompanying drawing on which Figure 1 is a side-view of a steel bar of hexagonal cross-section into which a few windings or threads have already been cut. Figure 2 is a similar view, in which the steel bar has been provided with as many windings or threads as are requisite for a nut, and the above-mentioned circumferential groove is just in course of production. Figure 3 is again a similar view, the circumferential groove being finished and the core being bored out. Figure 4 is an axial section through the members holding the nut in compressed state, the nut being shown in side-view; and Figure 5 is a side-view of the locking nut in its finished state, this figure being drawn to an enlarged scale relative to Fig. 4.

In Fig. 1, *a* denotes the steel bar of hexagonal transverse section, *b* are windings or threads that have been cut into said bar, and *c* is the remaining core. When as many windings have been made as are required for a nut (generally three), a circumferential groove *d* (Figs. 2 and 3) is produced whereby the bar piece having the threads or windings is separated from the body part of the bar, but is nevertheless integrally connected therewith by the core *c*. Now the core is bored out (Fig. 3) so that a helical piece is obtained which then is compressed by suitable means, for instance such as the parts $e$, $f$ and $g$ shown in Fig. 4 which parts need not be described in detail (Fig. 4). When the helical piece is in this state, the bolt thread is cut into the nut, and then the latter is freed from the axial pressure so that it assumes its ultimate shape owing to the elasticity of the material (Fig. 5). The compressing members $e$ and $g$ have bores $e^1$ and $g^1$ for the passage of the tap (not shown). Finally, the nut is first heated and then cooled in well-known manner so as thereby to harden it in the usual way. If desired, the width of the internal thread may be separately adjusted prior to the hardening, whereby at the same time the elasticity of the locking nut can be regulated.

I claim:

1. The method of manufacturing elastic locking nuts, consisting in cutting into a steel bar of hexagonal cross-section threads of such a depth that the diameter of the remaining core corresponds practically to the bolt hole in the finished nut, cutting into the bar after the last thread a groove having the same depth as said threads, boring out said core so that the thus produced bore communicates with said groove so as to thereby finally separate the threaded portion of the bar from its body part; compressing the separated threaded part causing its windings to contact with one another, cutting a bolt thread into the bore of the compressed nut, and finally freeing the nut from its axial pressure.

2. The method of manufacturing locking nuts, consisting in cutting into a steel bar of hexagonal cross-section a helical groove of such a depth that the diameter of the remaining core corresponds approximately to the diameter of the bore of the finished nut cutting into the bar after the last winding of said helical groove a circumferential groove having the same depth as said helical one, boring out said core so that the thus produced bore communicates with both grooves so as to separate the grooved portion of the bar from its body part; compressing the separated helical portion causing its windings to contact with one another, cutting a bolt thread into the bore of the compressed nut, liberating the nut from its axial pressure, and finally heating and cooling the nut to harden it.

In testimony whereof I affix my signature.

HEINRICH SCHALK.